US006332101B1

United States Patent
Kaneko et al.

(10) Patent No.: US 6,332,101 B1
(45) Date of Patent: Dec. 18, 2001

(54) OFF-LINE TEACHING METHOD FOR CORRECTING ROBOT MODEL BY REVISING TEACHING DATA ON BASIS OF DIFFERENCE BETWEEN ACTUAL AND TARGET POSITION

(75) Inventors: Masakatsu Kaneko, Hanno; Shinji Aoki, Sayama, both of (JP)

(73) Assignee: Honda Giken Kogya Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/116,202

(22) Filed: Jul. 16, 1998

(30) Foreign Application Priority Data

Jul. 16, 1997 (JP) .................................................. 9-191459

(51) Int. Cl.⁷ ............................. G06F 19/00; G05F 13/02
(52) U.S. Cl. ................................ 700/245; 700/29; 700/31
(58) Field of Search ................................ 700/29, 31, 245, 700/250, 253, 254, 264; 318/568.13, 568.14, 568.23, 568.11

(56) References Cited

U.S. PATENT DOCUMENTS

| | | | |
|---|---|---|---|
| 4,831,548 | * 5/1989 | Matoba et al. | 395/99 |
| 5,189,351 | * 2/1993 | Torii et al. | 318/568.19 |
| 5,341,458 | * 8/1994 | Kaneko et al. | 395/80 |
| 5,371,836 | * 12/1994 | Mitomi et al. | 395/80 |
| 5,412,759 | * 5/1995 | Yano et al. | 395/83 |
| 5,555,347 | * 9/1996 | Yoneda et al. | 395/82 |
| 5,668,930 | * 9/1997 | Hamura et al. | 395/87 |
| 5,724,489 | 3/1998 | Yamamoto et al. | |
| 6,000,827 | * 12/1999 | Hosogi et al. | 364/148.03 |

FOREIGN PATENT DOCUMENTS

| | | | |
|---|---|---|---|
| 360178509A | * 9/1985 | (JP) | G05B/19/42 |
| 401205207 | * 8/1989 | (JP) . | |
| A5-27828 | 2/1993 | (JP) . | |
| A5-289730 | 11/1993 | (JP) . | |
| A6-114769 | 4/1994 | (JP) . | |
| A6-274213 | 9/1994 | (JP) . | |
| A7191738 | 7/1995 | (JP) . | |
| A7-325611 | 12/1995 | (JP) . | |
| B22520324 | 5/1996 | (JP) . | |
| A8-174454 | 7/1996 | (JP) . | |
| A8-286722 | 11/1996 | (JP) . | |
| A8-286726 | 11/1996 | (JP) . | |

* cited by examiner

Primary Examiner—Thomas Lee
Assistant Examiner—Chun Cao

(57) ABSTRACT

Disclosed is an off-line teaching method for correcting a robot model to be used in an off-line teaching system. Multi-point multi-attitude teaching capable of obtaining the best correcting calculation result of those obtained with a logical robot model as a correction objective is performed by using an off-line teaching apparatus (steps S1 to S5). Teaching data obtained in the steps S1 to S5 is downloaded from the off-line teaching apparatus to an actual robot as a correction objective (step S6). Subsequently, the teaching data is revised on the basis of a difference between an actual target point and an operation point of the actual robot based on the teaching data (step S7). After that, teaching data obtained after the revision is uploaded to the off-line teaching apparatus (step S8) to estimate and calculate a correction amount by using the uploaded data (step S9). Accordingly, it is possible to stably obtain teaching data usable to accurately estimate the correction amount, and it is possible to decrease the number of working steps based on the use of the actual robot.

7 Claims, 3 Drawing Sheets

OFF-LINE TEACHING METHOD FOR CORRECTING ROBOT MODEL BY REVISING TEACHING DATA ON BASIS OF DIFFERENCE BETWEEN ACTUAL AND TARGET POSITION

BACKGROUND OF THE INVENTION

1. Field of the Invention

The present invention relates to an off-line teaching method which makes it possible to accurately estimate the amount of correction of teaching data previously obtained by instructing a logical robot model by using an off-line teaching apparatus.

2. Description of the Related Art

Recently, in order to apply the robot to various workings, in general, a variety of tools are attached to the face plate of the robot arm to allow the robot to perform working.

A large number of techniques for instructing the robot as well as a large number of techniques for making various types of correction for the instruction data have been hitherto suggested. For example, a method has been suggested in relation to the instruction technique for the robot (see Japanese Laid-Open Patent Publication No. 5-27828), in which information necessary for the robot working to be used is given in conformity with the request of a user as accurately as possible, and the burden for the user is mitigated as less as possible.

In relation to the technique for correcting the instruction data, the following methods have been suggested, including, for example, a method in which the revision for the instructed point and the correction for the instructed locus can be easily executed under the same operation condition as that used during playback even at a place separated from the working job site so that the burden for the operator to perform the operation for revising the instruction is mitigated (see Japanese Laid-Open Patent Publication No. 8-286726); a method in which the positional discrepancy can be automatically corrected for all striking positions with a high degree of accuracy (see Japanese Laid-Open Patent Publication No. 7-325611); a method in which the position of the robot is corrected by using a neural network (see Japanese Laid-Open Patent Publication No. 6-114769); a method in which the revising operation sensuously comprehensible for the operator can be performed when the conversion data for the robot operation is revised upon occurrence of malfunction in the operation range concerning the revised instruction data (see Japanese Laid-Open Patent Publication No. 5-289730); a method in which the repeated logical operation based on the modified Powel method is applied for respective elements of unknown variable matrix and constant matrix to ensure the absolute positional accuracy of an arm-type multi-joint robot by using only the angle of rotation of the arm axis while avoiding the measurement on the rectangular coordinate in order to further improve the accuracy and increase the computing speed (see Japanese Laid-Open Patent Publication No. 6-274213); and a method in which the setting error of a certain constant and the setting error of tool offset are automatically corrected by using setting data for a robot of the multi-joint type attached with a tool at its wrist (see Japanese Patent No. 2520324).

In relation to the setting of the tool cusp point, a method has been suggested (see Japanese Laid-Open Patent Publication No. 7-191738), in which the tool cusp point can be set for a desired attitude in accordance with a simple procedure by utilizing a simple setting jig even when the design data is not available. A method, which is based on the use of CAD data, has been suggested (see Japanese Laid-Open Patent Publication No. 8-286722), in which it is unnecessary for the operator to thoroughly input the initial setting data, the working procedure data, and the working operation data one by one so that the amount of input to be performed by the operator is greatly decreased. A method, which relates to presentation of locus, has been suggested (see Japanese Laid-Open Patent Publication No. 8-174454), in which the relative positional relationship between a workpiece and an actual position of an actually operating tool can be easily and accurately recognized when a workpiece is retracted from the working position.

However, in the illustrative conventional techniques concerning the off-line teaching described above, the working point of the robot is subjected to positional adjustment with a high degree of accuracy by using the attitude which differs as far as possible, with respect to the fixed point in the space at the working site at which the actual robot is installed. Moreover, the attitude has been arbitrarily determined by the judgement of the operator.

As described above, the conventional technique entrusts the judgement of the individual operator. Therefore, an inconvenience arises in that it is not necessarily possible to obtain the teaching data which is appropriate to calculate the correction amount. Further, a problem arises in that the conventional technique requires a long time, because the attitude is thought of at the working site.

SUMMARY OF THE INVENTION

The present invention has been made taking the foregoing problems into consideration, an object of which is to provide an off-line teaching method which makes it possible to stably obtain teaching data usable to accurately estimate the correction amount, and decrease the number of working steps based on the use of an actual robot.

According to the present invention, there is provided an off-line teaching method for correcting robot models to be used in an off-line teaching system, comprising a first step of performing multi-point multi-attitude teaching capable of obtaining the best correcting calculation result of those obtained with a logical robot model as a correction objective, by using an off-line teaching apparatus; a second step of downloading teaching data obtained in the first step from the off-line teaching apparatus to an actual robot as a correction objective; a third step of revising the teaching data on the basis of a difference between an actual target point and an operation point of the actual robot based on the teaching data; and a fourth step of uploading teaching data obtained after the revision to the off-line teaching apparatus to estimate and calculate a correction amount by using the uploaded data.

That is, the multi-point multi-attitude teaching is performed in the first step to create a plurality of attitudes capable of obtaining the best correcting calculation result by using the logical robot model as the correction objective. The teaching data is downloaded to the actual robot in the second step. In the next third step, the teaching data is revised on the basis of the difference between the actual target point and the operation point of the actual robot based on the teaching data. The teaching data, which is obtained after the revision, is uploaded to the off-line teaching apparatus. The uploaded data is used to estimate and calculate the correction amount. The correction amount concerning the actual robot installed at the working site is reflected to the logical robot model virtually constructed on the off-line teaching apparatus.

According to the present invention, the off-line teaching apparatus is used to perform the multi-point multi-attitude teaching capable of obtaining the best correcting calculation result for the logical robot model as the correction objective so that the teaching data to be downloaded to the actual robot is obtained. Therefore, it is possible to stably obtain the teaching data capable of accurately estimating the correction amount as compared with the conventional teaching data depending on the judgement of the individual operator.

As a result, it is unnecessary to consider the attitude at the working site, and it is enough to perform only simple positional adjustment. Thus, it is possible to decrease the number of working steps to be performed by using the actual robot.

In a preferred embodiment of the method described above, the first step comprises an error model-preparing step of preparing an error model corresponding to a model of the actual robot; a teaching step of performing the multi-point multi-attitude teaching by using the off-line teaching apparatus; an estimating calculation step of estimating and calculating the correction amount by using teaching data obtained in the teaching step; a comparing step of comparing a calculation result obtained in the estimating calculation step with the error model obtained in the error model-preparing step; and a judging step of returning to the teaching step if a result of the comparison obtained in the comparing step does not satisfy a predetermined condition, or completing the first step if the result of the comparison satisfies the predetermined condition.

According to this embodiment, the error model obtained in the error model-preparing step is compared in the judging step with the calculation result obtained by estimating and calculating the teaching data obtained in the teaching step. If the comparison result satisfies the predetermined condition, the teaching data is downloaded in the next second step.

On the other hand, if the comparison result does not satisfy the predetermined condition in the judging step, then the procedure returns to the teaching step again, and the multi-point multi-attitude teaching different from the above is performed to obtain the new teaching data. The estimating calculation of the correction amount and the comparing process for the error model are performed again on the basis of the obtained teaching data.

The series of operations described above are repeated. Thus, it is possible to obtain the multi-point multi-attitude teaching data capable of obtaining the best correcting calculation result.

Preferably, in the judging step, the judgement is made on the basis of a discrepancy amount of an estimated model obtained when the correction amount obtained in the estimating calculation step is reflected to the teaching data in the teaching step.

In this embodiment, it is preferable that the judgement is made on the basis of a discrepancy amount between the estimated model and the error model.

As described above, according to the off-line teaching method concerning the present invention, it is possible to stably obtain the teaching data usable to accurately estimate the correction amount, and it is possible to decrease the number of working steps based on the use of the actual robot.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An illustrative embodiment (hereinafter simply referred to as "off-line teaching system according to the embodiment of the present invention"), in which the off-line teaching method according to the present invention is applied, for example, to an off-line teaching system for a welding gun robot, will be explained below with reference to FIGS. 1 to 3.

Figure 1:
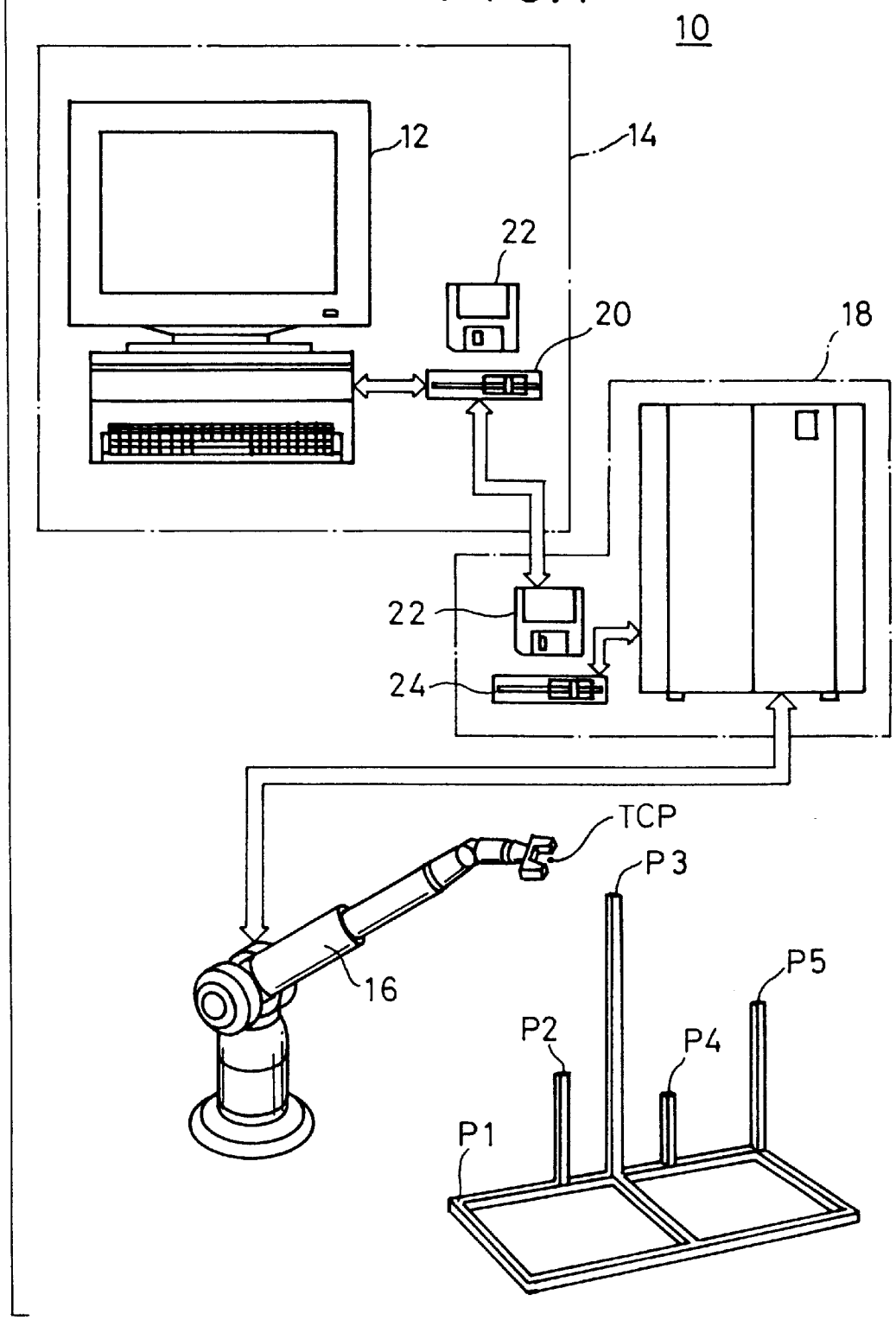
FIG. 1 shows an arrangement of an off-line teaching system according to an embodiment of the present invention.

As shown in FIG. 1, the off-line teaching system 10 according to the embodiment of the present invention comprises an off-line teaching apparatus 14 connected with a key input device such as a keyboard and a pointing device such as a mouse, for displaying, on a screen of a monitor 12, a logical robot model to simulate an actual robot; and a robot controller 18 for controlling the actual robot 16.

A flexible disk drive (hereinafter simply referred to as "FDD") 20 is connected to the off-line teaching apparatus 14. The teaching data, which is prepared by the off-line teaching apparatus 14, is recorded on a flexible disk 22 by the aid of FDD 20. The teaching data or the like, which is recorded on the flexible disk 22, is read by the off-line teaching apparatus 14 by the aid of FDD 20.

FDD 24 is connected to the robot controller 18 in the same manner as described above. The teaching data, which is subjected to revision and addition performed by the robot controller 18, is recorded on the flexible disk 22 by the aid of FDD 24. The teaching data or the like, which is recorded on the flexible disk 22, is read by the robot controller 18 by the aid of FDD 24.

Figure 2:
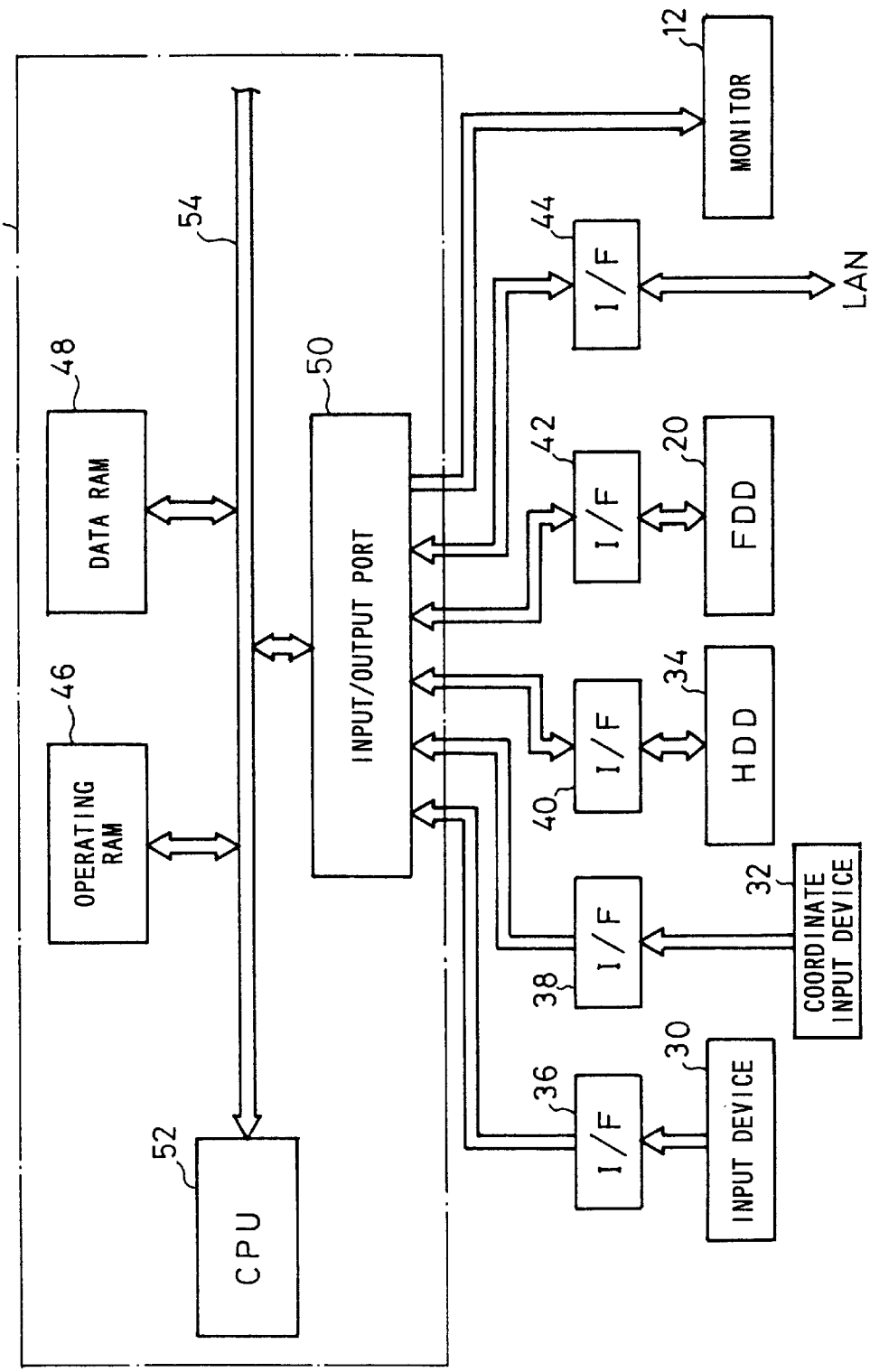
FIG. 2 shows a block diagram illustrating an arrangement of an off-line teaching apparatus used in the off-line teaching system according to the embodiment of the present invention.

As shown in FIG. 2, the off-line teaching apparatus 14 is connected with an input device 30 such as a keyboard, a coordinate input device 32 (pointing device) such as a mouse and a joystick, a hard disk drive (HDD) 34, and FDD 20 described above via interface (hereinafter simply referred to as "I/F") circuits 36, 38, 40, 42 respectively. LAN, which is used to transfer the teaching data or the like for another off-line teaching apparatus, is further connected to the off-line teaching apparatus 14 via an I/F circuit 44. The off-line teaching apparatus 14 further comprises the monitor 12 for displaying the teaching data incorporated through LAN and the teaching data prepared by the off-line teaching apparatus 14.

The off-line teaching apparatus 14 comprises an operating RAM 46 to be used for operating various programs (for example, teaching processing programs), a data RAM 48 for storing, for example, data fed from the external devices (for example, LAN, the coordinate input device 32, and HDD 34) and data processed by means of various programs, an input/output port 50 for inputting and outputting data from and to the external devices, and CPU (control unit and logical operation unit) 52 for controlling the respective circuits.

The respective circuits are subjected to data transfer therebetween via a data bus 54 led from CPU 52. The respective circuits are controlled by CPU 52 by the aid of an address bus and a control bus (both of which are not shown) led from CPU 52.

Figure 3:
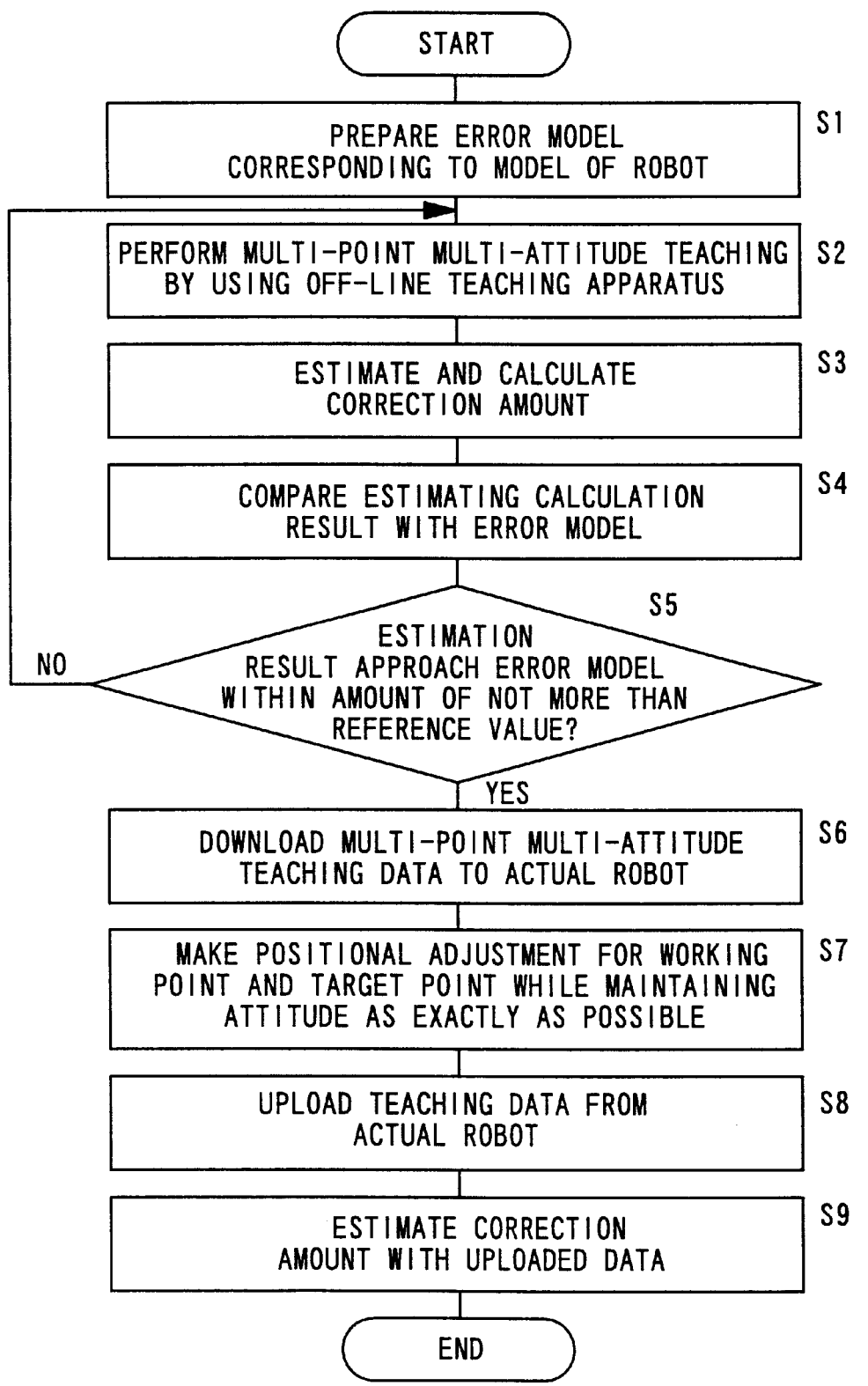
FIG. 3 shows a flow chart illustrating the operation of the off-line teaching system according to the embodiment of the present invention.

The off-line teaching system 10 according to the embodiment of the present invention performs the teaching for correcting the robot model in accordance with a procedure shown in FIG. 3.

That is, an error model, which corresponds to the type of the actual robot 16, is prepared in an initial step S1. The preparing process is performed by using the off-line teaching apparatus or another computer or the like.

Specifically, the procedure for preparing the error model will be explained. At first, in order to simplify the explanation, it is assumed that the logical robot model corresponding to the actual robot 16 has a number of axes (number of joints) of six, no tool offset is considered, and the error lies in only an zero offset error of the sensor. In this embodiment, the sensor is an encoder attached to each of the axes. In the following description, when the actual robot 16 is not distinguished from the logical robot model to make explanation as being a general robot, the description will be made merely referring to "robot".

When the tool cusp point (TCP) of the robot is adjusted at an arbitrary one point, the following expressions hold.

$$X = f_X(\theta_1 + \varepsilon_1, \theta_2 + \varepsilon_2, \ldots, \theta_6 + \varepsilon_6) \quad (1)$$
$$Y = f_Y(\theta_1 + \varepsilon_1, \theta_2 + \varepsilon_2, \ldots, \theta_6 + \varepsilon_6)$$
$$Z = f_Z(\theta_1 + \varepsilon_1, \theta_2 + \varepsilon_2, \ldots, \theta_6 + \varepsilon_6)$$

In the expressions, $f_X$, $f_Y$, and $f_Z$ are functions determined by the mechanical structure of the robot (for example, the type of the pair and the length of the link). $\theta_i$ (i=1, 2, ..., 6) represents the angle of the ith axis (i=1, 2, ..., 6) calculated from the data detected by the axis sensor (encoder), and $\varepsilon_i$ represents the sensor offset error for the ith axis.

In general, assuming that the error is in a minute amount, the cusp position (TCP) of the robot can be expressed by a linear expression of the error. If the angle is small, the strict expressions are composed of simultaneous equations of trigonometric functions. However, it is generally impossible to obtain the solution for the simultaneous equations. Accordingly, when the Taylor expansion is performed in order to linearize the expression, the cusp position (TCP) of the robot can be finally expressed by using the linear expression of the error. In this situation, it is possible to obtain the solution, because it is possible to use the general method for obtaining the solution of simultaneous equations.

Therefore, when the expression (1) is arranged while regarding $\varepsilon_1$ to be a minute amount and neglecting quadratic items and higher order items, the following expression (2) is given.

$$X = C_{0X} + \sum_{i=1}^{6} C_{iX} \cdot \varepsilon_i \quad (2)$$
$$Y = C_{0Y} + \sum_{i=1}^{6} C_{iY} \cdot \varepsilon_i$$
$$Z = C_{0Z} + \sum_{i=1}^{6} C_{iZ} \cdot \varepsilon_i$$

The expression (2) lies in simultaneous linear expressions, the solution of which can be obtained if independent expressions of a number not less than the number of unknown quantities are established. Coefficients $C_{0X}$, $C_{0Y}$, $C_{0Z}$, $C_{1X}$, $C_{1Y}$, and $C_{1Z}$, can be obtained from operation expressions determined from the angle calculated from the data detected by the axis sensor and the structure of the robot (for example, the type of the pair and the length of the link).

The expression (2) may be expressed in the following matrix form.

$$\begin{bmatrix} C_{1X} & C_{2X} & C_{3X} & C_{4X} & C_{5X} & C_{6X} & -1 & 0 & 0 \\ C_{1Y} & C_{2Y} & C_{3Y} & C_{4Y} & C_{5Y} & C_{6Y} & 0 & -1 & 0 \\ C_{1Z} & C_{2Z} & C_{3Z} & C_{4Z} & C_{5Z} & C_{6Z} & 0 & 0 & -1 \\ C_{1X} & C_{2X} & C_{3X} & C_{4X} & C_{5X} & C_{6X} & -1 & 0 & 0 \\ C_{1Y} & C_{2Y} & C_{3Y} & C_{4Y} & C_{5Y} & C_{6Y} & 0 & -1 & 0 \\ C_{1Z} & C_{2Z} & C_{3Z} & C_{4Z} & C_{5Z} & C_{6Z} & 0 & 0 & -1 \\ C_{1X} & C_{2X} & C_{3X} & C_{4X} & C_{5X} & C_{6X} & -1 & 0 & 0 \\ C_{1Y} & C_{2Y} & C_{3Y} & C_{4Y} & C_{5Y} & C_{6Y} & 0 & -1 & 0 \\ C_{1Z} & C_{2Z} & C_{3Z} & C_{4Z} & C_{5Z} & C_{6Z} & 0 & 0 & -1 \end{bmatrix} \begin{bmatrix} \varepsilon_1 \\ \varepsilon_2 \\ \varepsilon_3 \\ \varepsilon_4 \\ \varepsilon_5 \\ \varepsilon_6 \\ X \\ Y \\ Z \end{bmatrix} = \begin{bmatrix} -C_{0X} \\ -C_{0Y} \\ -C_{0Z} \\ -C_{0X} \\ -C_{0Y} \\ -C_{0Z} \\ -C_{0X} \\ -C_{0Y} \\ -C_{0Z} \end{bmatrix} \quad (3)$$

This expression represents the error model.

Next, in a step S2, the multi-point multi-attitude teaching is performed by using the off-line teaching apparatus 14.

Usually, three expressions are established for one attitude. Therefore, instruction may be made in a degree corresponding to the number of attitudes with which a necessary number of expressions are established in the expression (3). The expression (3) includes nine unknown qualities. Therefore, instruction may be made for three or more attitudes.

The solution of the simultaneous linear expressions as described above is obtained to determine $\varepsilon_1$ to $\varepsilon_6$, X, Y, and Z. Thus, the error model is determined, for example, for selected three attitudes. For example, if one of $\varepsilon_1$ to $\varepsilon_6$ is deviated from the error range, convergence is made to obtain an optimum value by using the Newton's method.

The data, which relates to various attitudes in order to obtain the solution of the expression (2), is previously prepared in a large amount by using the off-line teaching apparatus 14 or another computer so that the data is stored as a file in the hard disk or another external storage device. The data is successively read from the file, or only the data, which satisfies a specified condition, is read from the file, when the error model is subjected to the computing operation. Thus, an algorithm is assembled to automatically perform the computing operation for the expression (2). Alternatively, the procedure may be performed manually.

Next, in a step S3, the correction amount is estimated and calculated by using the error model obtained in the step S2. The correction amount is used to postulate the appropriate degree of change of $\varepsilon_1$ to $\varepsilon_6$ when the actual robot 16 is subjected to the teaching. The postulation extremely simplifies the positional adjustment performed at the working site.

In the estimating calculation performed in the step S3, the position of TCP (X, Y, Z) is determined by manipulation of substituting $\epsilon_1$ to $\epsilon_6$ with appropriate numerical values, or appropriately changing the values of $\epsilon_1$ to $\epsilon_6$ while considering the operation environment (for example, the space and the operation time) at the working site. That is, $\epsilon_1$ to $\epsilon_6$ are allowed to include the noise component.

In the next step S4, the estimating calculation result obtained in the step S3 is compared with the error model obtained in the step S2. Specifically, the discrepancy amount is determined between the positions of TCP based on the instruction for the three attitudes selected in the step S2 and the plurality of positions of TCP determined by the estimating calculation in the step S3 respectively. Further, the discrepancy amount is determined between another specified point and the plurality of positions of TCP determined by the estimating calculation in the step S3 respectively, if necessary.

In the next step S5, it is judged whether or not the estimating calculation result approaches the error model within an amount of not more than the reference value. Specifically, one of the following evaluation methods or a combination of two or more of them can be adopted.

(1) It is evaluated whether or not the average value of the respective discrepancy amounts determined in the step S4 is not more than the reference value.

(2) It is evaluated whether or not the worst value of the respective discrepancy amounts determined in the step S4 is not more than the reference value.

(3) It is evaluated whether or not the worst value of the respective discrepancy amounts with respect to the specified point determined in the step S4 is not more than the reference value.

(4) It is judged whether or not the value of the matrix element is computable in the operation processing. For example, it is judged whether the matrix is a normal matrix or a peculiar matrix, or whether the matrix is controllable or observable.

If the affirmative judgement is made in the step S5, the procedure proceeds to the next step S6. If the negative judgement is made, the procedure returns to the step S2 to perform the process of the step S2 and the followings. That is, the multi-point multi-attitude teaching (teaching for other three attitudes), which is different from the previous teaching, is performed again in the step S2 to obtain a new error model. In the next step S3, the correction amount is estimated and calculated on the basis of the new error model. In the step S4, the estimating calculation result is processed and compared with the new error model.

The series of operations described above are repeated until the affirmative result is obtained in the step S5. Therefore, the teaching data, which constructs the error model judged to give the affirmative result in the step S5, is the multi-point multi-attitude teaching data capable of obtaining the best correcting calculation result.

Subsequently, in a step S6, the multi-point multi-attitude teaching data is downloaded to the robot controller 18 for the actual robot 16. The download is performed, for example, by recording the multi-point multi-attitude teaching data on the flexible disk 22 by the aid of FDD 20 connected to the off-line teaching apparatus 14, and then allowing the robot controller 18 to read the multi-point multi-attitude teaching data recorded on the flexible disk 22 by the aid of FDD 24 connected to the robot controller 18.

The embodiment described above is illustrative of the case based on the use of the flexible disk 22. Alternatively, it is possible to use, as the download medium, optical disks such as MO and CD-R. Further alternatively, when the off-line teaching apparatus 14 is connected to the robot controller 18 via LAN, the download may be performed by the aid of LAN.

Next, in a step S7, the actual robot 16 is operated in accordance with the control effected by the robot controller 18 to move TCP to several target points P1, P2, P3, P4, P5. When the position of the target point deduced from the teaching data is defined as the working point, positional adjustment is made for the working point and the actual target points P1, P2, P3, P4, P5 in the step S7. In this process, the movement amount brought about by the positional adjustment is reflected to the teaching data so that the teaching data is subjected to revision and addition.

The multi-point multi-attitude teaching data downloaded to the robot controller 18 is the highly accurate teaching data which limitlessly approximates the actual robot 16 by using the logical robot model. Therefore, the positional adjustment in the step S7 can be performed while scarcely changing the attitude.

Subsequently, in a step S8, the teaching data after the revision, which is registered in the robot controller 18, is uploaded to the off-line teaching apparatus 14. The upload is performed, for example, by recording the teaching data after the revision on the flexible disk 22 by the aid of FDD 24 connected to the robot controller 18, and then allowing the off-line teaching apparatus 14 to read the teaching data after the revision recorded on the flexible disk 22 by the aid of FDD 20 connected to the off-line teaching apparatus 14, in the same manner as performed in the download described above.

The embodiment described above is illustrative of the case based on the use of the flexible disk 22. Alternatively, it is possible to use, as the upload medium, optical disks such as MO and CD-R. Further alternatively, when the off-line teaching apparatus 14 is connected to the robot controller 18 via LAN, the upload may be performed by the aid of LAN.

In the next step S9, the correction amount is estimated and calculated by using the teaching data after the revision uploaded to the off-line teaching apparatus 14. The correction amount for the actual robot 16 installed at the working site is reflected to the logical robot model on the off-line teaching apparatus 14, by means of the estimating calculation.

As a result, when it becomes necessary that another operation (manipulation) is performed by the identical actual robot 16, it is possible to easily and highly accurately prepare the instruction program for performing the operation (manipulation) by using the logical robot model.

In the off-line teaching system 10 according to the embodiment of the present invention, the error model prepared in the step S1 is compared with the calculation result obtained by estimating and calculating, in the step S3, the teaching data obtained in the step S2, in the subsequent step S4. If the result of the comparison satisfies the predetermined condition, the teaching data is downloaded to the robot controller 18 in the step S6.

On the other hand, if the result of the comparison in the step S4 does not satisfy the predetermined condition, the procedure returns to the step S2 again to perform the multi-point multi-attitude teaching which is different from the foregoing teaching so that new teaching data is obtained. The estimating calculation and the process for making comparison with the error model are performed again on the basis of the teaching data.

Thus, the multi-point multi-attitude teaching data, with which the best correcting calculation result is obtained, is obtained by repeating the series of operations described above.

As described above, in the off-line teaching system 10 according to the embodiment of the present invention, the multi-point multi-attitude teaching, with which the best correcting calculation result is obtained for the logical robot model as the correction objective, is performed by using the off-line teaching apparatus 14 in the steps S1 to S5 to obtain the teaching data to be downloaded to the actual robot 16. Accordingly, it is possible to stably obtain the teaching data which makes it possible to accurately estimate the correction amount, as compared with the conventional teaching data depending on the judgement of the individual operator.

As a result, it is unnecessary to think of the attitude at the working site, and it is enough to perform only the simple positional adjustment. Therefore, it is possible to decrease the number of working steps based on the use of the actual robot 16.

In the embodiment described above, the estimating calculation for the correction amount is performed, assuming that the six-axis robot is used. However, it is a matter of course that the present invention is also applicable to robots other than the six-axis robot.

The embodiment described above is illustrative of application to the off-line teaching system 10 for the welding gun robot. Besides, the present invention is also applicable to a variety of robots used for production.

It is a matter of course that the off-line teaching method according to the present invention is not limited to the embodiment described above, which may be embodied in other various forms without deviating from the gist or essential characteristics of the present invention.

What is claimed is:

1. An off-line teaching method for correcting robot models to be used in an off-line teaching system, comprising:
   a first step of performing multi-point multi-attitude teaching capable of obtaining the best correcting calculation result of those obtained with a logical robot model as a correction objective based on an error model corresponding to a modal of an actual robot, by using an off-line teaching apparatus;
   a second step of downloading teaching data obtained in said first step from said off-line teaching apparatus to a robot controller of said actual robot as a correction objective;
   a third step of revising said teaching data in said robot controller on the basis of a difference between an actual target point and an operation point of said actual robot based on said teaching data;
   a fourth step of uploading teaching data obtained after said revision from said robot controller to said offline teaching apparatus: and
   a fifth step of estimating and calculating a correction amount to obtain teaching data in said off-line teaching apparatus by using said uploaded data.

2. The off-line teaching method according to claim 1, wherein said first step comprises:
   an error model-preparing step of preparing an error model corresponding to a model of said actual robot;
   a teaching step of performing said multi-point multi-attitude teaching by using said off-line teaching apparatus;
   an estimating calculation step of estimating and calculating said correction amount by using teaching data obtained in said teaching step;
   a comparing step of comparing a calculation result obtained in said estimating calculation step with said error model obtained in said error model-preparing step; and
   a judging step of returning to said teaching step if a result of said comparison obtained in said comparing step does not satisfy a predetermined condition, or completing said first step if said result of said comparison satisfies said predetermined condition.

3. The off-line teaching method according to claim 2, wherein said judgement is made in said judging step on the basis of a discrepancy amount of an estimated model obtained when said correction amount estimated in said estimating calculation step is reflected to said teaching data in said teaching step.

4. The off-line teaching method according to claim 3, wherein said judgement is made in said judging step on the basis of a discrepancy amount between said estimated model and said error model.

5. An off-line teaching method for correcting robot models to be used in an off-line teaching system, comprising:
   a first step of performing multi-point multi-attitude teaching capable of obtaining the best correcting calculation result of those obtained with a logical robot model as a correction objective, by using an off-line teaching apparatus;
   said first step including the following steps:
      an error model-preparing step of preparing an error model corresponding to a model of said actual robot;
      a teaching step of performing said multi-point multi-attitude teaching by using said off-line teaching apparatus;
      an estimating calculation step of estimating and calculating said correction amount by using teaching data obtained in said teaching step;
      a comparing step of comparing a calculation result obtained in said estimating calculation step with said error model obtained in said error model-preparing step; and
      a judging step of returning to said teaching step if a result of said comparison obtained in said comparing step does not satisfy a predetermined condition, or completing said first step if said result of said comparison satisfies said predetermined condition;
   a second step of downloading teaching data obtained in said first step from said off-line teaching apparatus to an actual robot as a correction objective;
   a third step of revising said teaching data on the basis of a difference between an actual target point and an operation point of said actual robot based on said teaching data; and
   a fourth step of uploading teaching data obtained after said revision to said off-line teaching apparatus to estimate and calculate a correction amount by using said uploaded data.

6. The off-line teaching method according to claim 5, wherein said judgement is made in said judging step on the basis of a discrepancy amount of an estimated model obtained when said correction amount estimated in said estimating calculation step is reflected to said teaching data in said teaching step.

7. The off-line teaching method according to claim 6, wherein said judgement is made in said judging step on the basis of a discrepancy amount between said estimated model and said error model.

* * * * *

UNITED STATES PATENT AND TRADEMARK OFFICE
CERTIFICATE OF CORRECTION

PATENT NO. : 6,332,101 B1
DATED : December 18, 2001
INVENTOR(S) : Masakatsu Kaneko et al.

It is certified that error appears in the above-identified patent and that said Letters Patent is hereby corrected as shown below:

<u>Title page,</u>
Item [73], Assignee, correct the assignee's name from "Honda Giken Kogya Kabushiki Kaisha, Tokyo (JP)" to -- Honda Giken Kogyo Kabushiki Kaisha, Tokyo (JP) --

Signed and Sealed this

Twentieth Day of August, 2002

Attest:

JAMES E. ROGAN
Attesting Officer           Director of the United States Patent and Trademark Office